(No Model.)
W. S. SCALES.
JOURNAL BEARING.
No. 417,340. Patented Dec. 17, 1889.
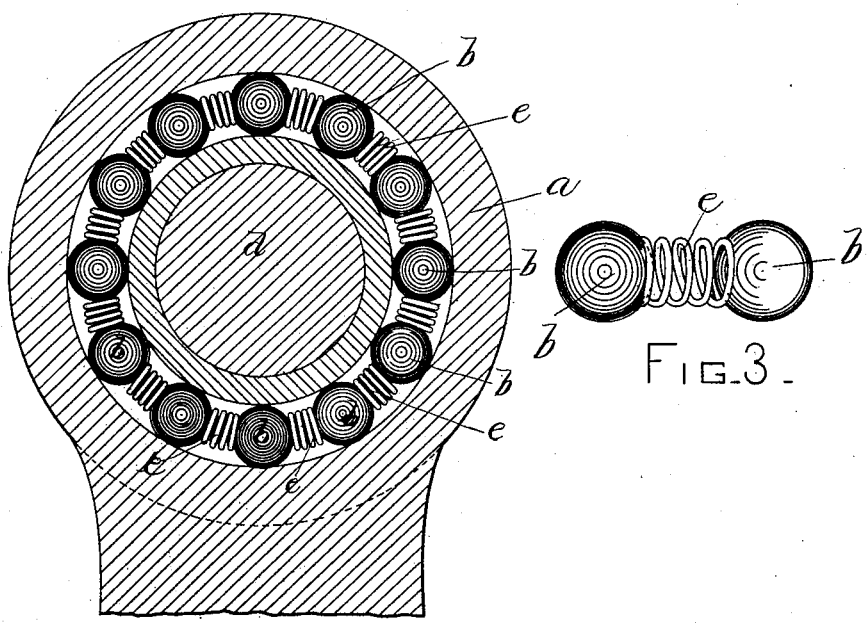
Fig. 1.
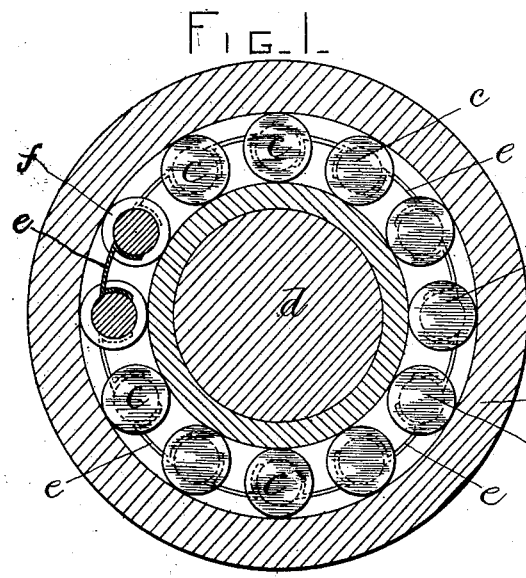
Fig. 2.
Fig. 3.
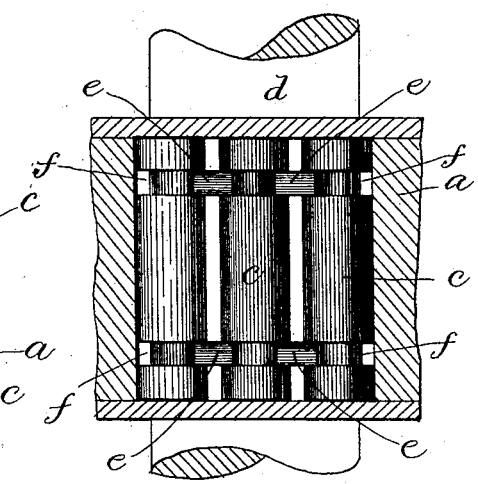
Fig. 4.
WITNESSES.
H. Brown
W. C. Ramsay.
INVENTOR.
Wm. S. Scales

UNITED STATES PATENT OFFICE.

WILLIAM S. SCALES, OF EVERETT, ASSIGNOR OF TWO-THIRDS TO GEORGE G. FROST, TRUSTEE, OF NEWTON, AND JOSEPH H. CLARKE, OF EAST WEYMOUTH, MASSACHUSETTS.

JOURNAL-BEARING.

SPECIFICATION forming part of Letters Patent No. 417,340, dated December 17, 1889.

Application filed April 16, 1889. Serial No. 307,466. (No model.)

*To all whom it may concern:*

Be it known that I, WILLIAM S. SCALES, of Everett, in the county of Middlesex and State of Massachusetts, have invented certain new and useful Improvements in Journal-Bearings, of which the following is a specification.

My invention relates to that class of bearings commonly known as "ball" and "roller" bearings, in which, for the purpose of lessening the friction, the journal-bearing consists of a rolling support.

The invention consists, broadly, of yielding partitions interposed between the balls or rollers, so as to keep the latter from coming in frictional contact with each other, all as is hereinafter fully described, and subsequently pointed out in the claim.

Of the drawings hereunto annexed and forming a part of this specification, Figure 1 represents an end view of a journal and ball bearing embodying my invention. Fig. 2 is an end view of a journal and roller bearing also embracing my invention. Fig. 3 is a perspective view showing a way in which balls forming a journal-bearing may be separated in accordance with my invention. Fig. 4 is a perspective view of two rollers adapted to constitute an anti-friction bearing having one form of my improved yielding partitions interposed therebetween.

The same letters of reference designate the same parts in all of the views.

One of the defects or objections arising in the use of ball or roller bearings, where balls or rollers form a complete circle around the journal, is in the fact that at the point where the journal rests or bears with greatest pressure, the balls or rollers, being in contact with each other, operate with very considerable frictional or grinding force, one against the other, the surfaces of adjacent balls or rollers moving in opposite directions.

In carrying out my invention in the obviation of this defect or objection, I construct a suitable box or support $a$ for the reception of the balls $b$ or rollers $c$, as the case may be, which are arranged in the box or support $a$ around the journal $d$, separating such balls or rollers with yielding partitions $e$, here shown as springs having sufficient tension only to keep the balls or rollers separated when the journal does not rest or bear with greatest force thereon, and which will be sufficient to guide the balls or rollers in this properly-separated position between the box or support $a$ and journal $d$ to the point where the latter bears with greatest force upon the former, and so avoiding a possibility of one ball or roller coming into frictional contact with another, and obviating the objection before mentioned, it being observed that the frictional action of the yielding partitions $e$ upon the balls or rollers is inconsequential, and also that after the balls or rollers have been guided to position between the journal and box or support, where the former operates with greatest force, said balls or rollers will maintain their position to all intents and purposes until released, so that the yielding partitions may again act thereon.

The yielding partitions $e$ may be variously constructed, as is manifest.

Where balls are used, as is indicated in Figs. 1 and 3, I may employ as a separating means a short spiral spring, the ends of which may be soldered or otherwise secured to one of the coils, thus forming rings at each end of the coil, in which the balls may be seated, and by means of which the spring may be kept in place; or, as where rollers are used, I may employ the form of spring shown in Figs. 2 and 4, turning grooves $f$ in the rollers, and so arranging the springs that one leaf of each will rest in a groove $f$ of one roller and the other in a similar groove of the adjacent roller. I do not, however, confine myself to the form of springs shown, since it is necessary only that the balls or rollers should be separated by partitions having a yielding or resilient property.

Having thus explained the object and nature of my invention, I declare that what I claim is—

A bearing for journals, &c., consisting of balls or rollers arranged about the journal, said balls or rollers having yielding partitions interposed therebetween, substantially as set forth.

In testimony whereof I have signed my name to this specification, in the presence of two subscribing witnesses, this 29th day of March, A. D. 1889.

WILLIAM S. SCALES.

Witnesses:
ARTHUR W. CROSSLEY,
A. D. HARRISON.